E. C. LIPPS.
PROCESS OF METAL WELDING.
APPLICATION FILED NOV. 9, 1917.
1,342,717.
Patented June 8, 1920.
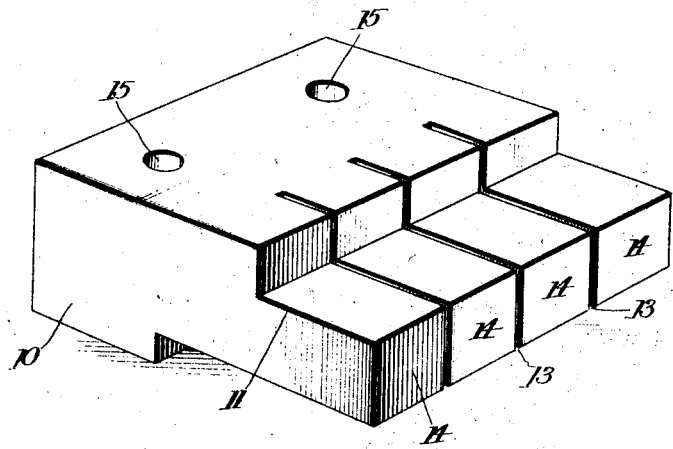
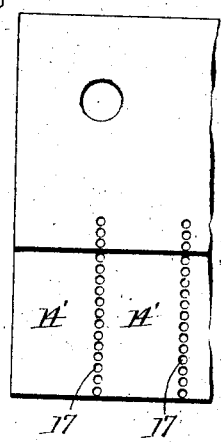
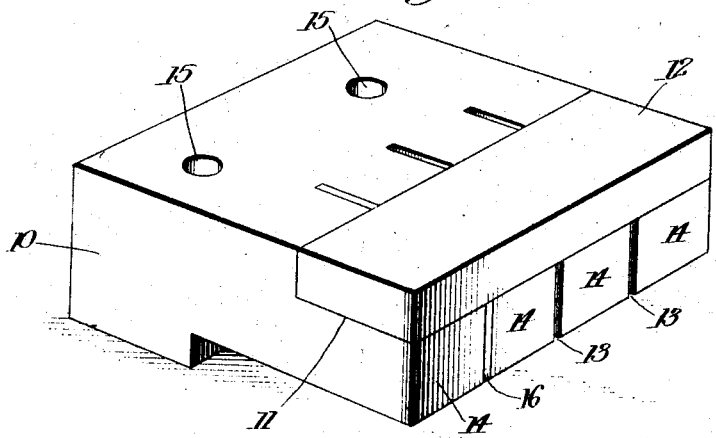
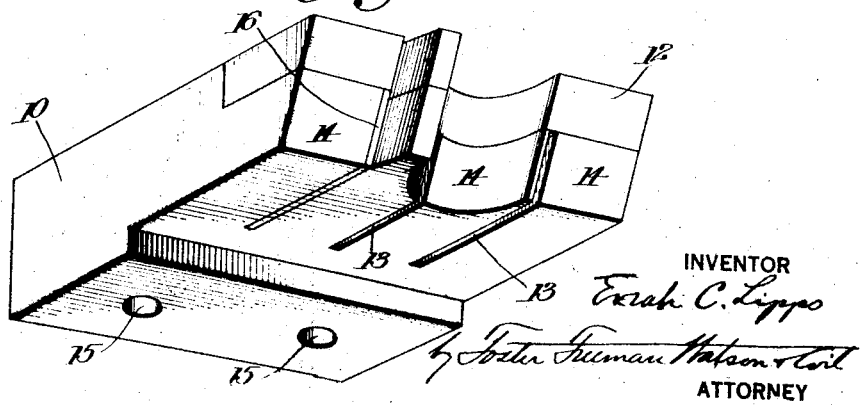
INVENTOR
Ezrah C. Lipps
by Foster Freeman Watson + Coit
ATTORNEY

UNITED STATES PATENT OFFICE.

EVRAH C. LIPPS, OF DETROIT, MICHIGAN, ASSIGNOR TO PACKARD MOTOR CAR COMPANY, OF DETROIT, MICHIGAN, A CORPORATION OF MICHIGAN.

PROCESS OF METAL-WELDING.

1,342,717.

Specification of Letters Patent.  Patented June 8, 1920.

Application filed November 9, 1917. Serial No. 201,143.

*To all whom it may concern:*

Be it known that I, EVRAH C. LIPPS, a citizen of the United States, and residing at Detroit, Wayne county, State of Michigan, have invented certain new and useful Improvements in Processes of Metal-Welding, of which the following is a specification.

This invention relates to the art of metal working and more particularly to a process for integrally uniting a plurality of pieces of metal; and to the product of the process.

Heretofore, as far as I am aware, it has not been possible to electrically weld by the resistance method two pieces which differ in size or properties, by a series of spot welds, where the weld desired exceeds in area the capacity of the machine. In other words a machine having a capacity to weld an area up to one square inch, could not be utilized to weld an area of four square inches by making four successive welds. Where the pieces differ in size, or properties such as the specific electrical resistance, one of the pieces will reach a welding heat and burn before the other reaches such heat, if indeed the latter piece reaches a weld heat at all. According to the present invention, however, these difficulties have been overcome so that pieces having different characteristics as mentioned above may be integrally joined by a series of electrical spot welds.

The objects and features of the invention will be apparent from the description taken in connection with the drawings in which:

Figure 1 is a perspective view showing a piece of metal prepared to have a second piece welded thereto, the preparation consisting in forming grooves, slots, or air gaps;

Fig. 2 is a perspective view showing the two pieces welded together and one of the air gaps filled up;

Fig. 3 is another perspective view illustrating a tool formed from the welded-together-pieces; and Fig. 4 is a partial plan view showing an alternative method of preparing the piece of metal shown in Fig. 1.

Although a tool has been chosen to illustrate a product which can be made according to the method of this invention, it is to be distinctly understood that the process may be practised to manufacture innumerable products, and is not limited to the manufacture of tools.

Referring to the drawings, a piece of metal 10, which is shown as adapted for the stock of a tool, is formed with a seat 11 at an edge portion thereof to receive a piece of high speed steel 12 which may be an alloy steel, for example a steel containing tungsten. Extending transversely of the seat are a plurality of spaced grooves, slots, or air gaps 13, thus dividing a portion of the piece 10 into sections 14. The slots 13 act to electrically and thermally insulate the sections 14 from each other. The stock of the tool may be formed with holes 15 to coöperate with pins or bolts to hold the same in a machine, and may be made from a cheaper steel, such as machinery steel.

In order to join the piece of high speed steel to the stock, the former is placed on the seat 11 of the stock and the two pieces secured in an electric welding machine, one terminal of the welding circuit being connected to a section 14 and the other terminal being placed on the piece 12 directly over the said section, the machine having at least a capacity to weld an area equal to the top surface of the section. The circuit is then closed and the current passing from the section 14 to the high speed steel raises the contacting surfaces to welding heat and fuses them together. The size of the sections 14, or in other words, the number of air gaps formed in the stock extend transversely of the high speed steel depends on the capacity of the machine, the section being formed so as to provide a welding surface within the capacity of the machine.

After having welded together one of the sections 14 and the piece of high speed steel, the other sections are successively welded to the piece 12. The resulting product is illustrated in Fig. 2, and may be machined or worked to give a tool any desired shape, one form being shown in Fig. 3.

If it is desired to compensate for the loss of strength due to the slots 13, they may be filled up with a suitable material, as shown at 16 in Figs. 2 and 3. If a metal filler is used it may be welded to the surrounding metal by the acetylene process or in any other desired manner.

Instead of preparing the piece 10 by slotting the same, I may form rows of closely spaced small holes 17 as shown in Fig. 4, thereby dividing the piece into the sections 14'. The small piece of steel may then be welded to the body in the same manner as described above. The resulting weld is entirely satisfactory. Furthermore the product is stronger than where slots are employed as the holes do not weaken the body piece as much.

From the foregoing description it will be seen that I have disclosed a method for integrally joining two pieces of metal by a series of spot welds in which a piece of high speed steel is welded to a larger piece of machinery or a cheaper steel. The specific electrical resistance of high speed steel is greater than that of machinery steel. Because of this property, the current passing through the pieces tends to heat the high speed steel first, where my method is not employed. Moreover in cases where it is desired to weld a small piece of metal to a larger piece, the small piece heats first and burns before the large piece reaches a welding heat. My method therefore is particularly applicable where it is desired to join two pieces of different electrical resistances by a series of spot welds, or where the pieces are of different sizes. It is to be understood however that the process is not limited to these two cases or a combination of them, but is applicable to many other cases within the scope of the appended claims.

Having thus described my invention what is claimed as new and desired to be secured by Letters Patent is:—

1. The method of electrically welding two pieces of metal having a greater weld surface than the capacity of the machine, consisting in dividing the weld surface of one piece into a plurality of surfaces each equal to or less than the capacity of the machine, and successively welding these latter surfaces to the other piece.

2. The method of electrically welding two pieces of metal having a greater weld surface than the capacity of the machine consisting in cutting one piece to form a plurality of surfaces each equal to or less than the capacity of the machine, successively welding these latter surfaces to the other piece and filling the space where the metal was cut away.

3. The method of electrically welding two pieces of metal having a greater weld surface than the capacity of the machine consisting in cutting one piece to form a plurality of surfaces each equal to or less than the capacity of the machine, successively welding these latter surfaces to the other piece, filling the space where the metal was cut away, and welding this filling to the pieces.

4. The method of electrically welding two pieces of metal having a greater weld surface than the capacity of the machine consisting in dividing the weld surfaces into a plurality of contacting surfaces each equal to or less than the capacity of the machine, and welding these latter surfaces.

5. The method of welding a small piece to a larger piece of metal consisting in dividing the portion of the large piece at the weld into a plurality of sections and welding each section successively to the small piece.

6. The method of electrically welding a small piece to a large piece of metal having a greater weld surface than the capacity of the machine consisting in dividing the large piece into a plurality of sections and welding each section severally to the small piece.

7. The method of welding two pieces of metal consisting in forming a slot in the weld surface of one of the pieces thereby dividing said surface into a plurality of spaced surfaces, welding each of said latter surfaces to the other piece and filling said slot.

8. The method of welding two pieces of metal consisting in forming a slot in the weld surface of one of the pieces thereby dividing said surface into a plurality of spaced surfaces, welding each of said latter surfaces to the other piece, filling said slot with metal and welding the latter to one of the pieces.

9. The method of electrically welding two pieces of metal having a greater weld surface than the capacity of the machine, one piece having a higher specific electrical resistance than the other consisting in dividing the lower resistance piece into a plurality of sections and welding each section to the higher resistance piece.

10. The method of electrically welding two pieces of metal having a greater weld surface than the capacity of the machine, one piece having a higher specific electrical resistance than the other, and the latter being larger than the former consisting in dividing the lower resistance piece into a plurality of sections and welding each section to the higher resistance piece.

11. The method of joining two pieces of steels having different specific electrical resistances which consists in forming a slot in the piece having the lower electrical resistance and electrically welding the said pieces together.

12. The method of joining two pieces of steels having different specific electrical resistances which consists in forming a slot in the piece having the lower electrical resistance welding said pieces and filling up said slot.

13. The method of making a tool having a cutting portion of high speed steel and a stock of a cheaper steel, consisting in forming said stock with a seat for said cutting portion and a slot transverse to said seat, and electrically welding the cutting portion to its seat.

14. The method of making a tool having a cutting portion of high speed steel and a stock of a cheaper steel, consisting in forming said stock with a slot extending inward from one edge and electrically welding the cutting portion to the stock with the said portion extending across the slot.

15. The method of making a tool having a cutting portion of steel and a stock of steel, the cutting portion comprising a steel having a greater electrical resistance than the steel of the stock, consisting in forming said stock with a slot and electrically welding the cutting portion to the stock with the said portion extending across the slot.

16. The method of making a tool having a cutting portion of steel and a stock of steel, the cutting portion comprising a steel having a greater electrical resistance than the steel of the stock, consisting in forming said stock with a slot, welding said pieces and filling up the slot.

17. The method of joining a piece of tungsten steel to machinery steel, consisting in forming a slot in the machinery steel and then electrically welding the pieces with the tungsten steel piece extending across the slot in the machinery steel piece.

18. The method of producing an integral member of steel from a piece of one kind of steel and a plurality of sections of another steel consisting in placing the said piece of steel across the sections, the sections being spaced, and electrically welding each section to the said piece.

19. The method of electrically welding two pieces of metal having different electrical resistances in a resistance welding machine consisting in preparing the piece having the lower resistance to afford a path for the welding current of less cross sectional area than the path in the other piece, and then electrically welding said pieces.

In testimony whereof I affix my signature.

EVRAH C. LIPPS.